United States Patent
Guo et al.

(10) Patent No.: US 8,356,987 B2
(45) Date of Patent: Jan. 22, 2013

(54) COMPRESSOR WITH RETAINING MECHANISM

(75) Inventors: Huaming Guo, Suzhou New District (CN); Jun You, Suzhou (CN); Yong Cao, Suzhou (CN)

(73) Assignee: Emerson Climate Technologies, Inc., Sidney, OH (US)

( * ) Notice: Subject to any disclaimer, the term of this patent is extended or adjusted under 35 U.S.C. 154(b) by 489 days.

(21) Appl. No.: 12/207,072

(22) Filed: Sep. 9, 2008

(65) Prior Publication Data
US 2009/0068044 A1 Mar. 12, 2009

Related U.S. Application Data

(60) Provisional application No. 60/993,452, filed on Sep. 11, 2007.

(51) Int. Cl.
F04C 18/00 (2006.01)
F04C 2/00 (2006.01)

(52) U.S. Cl. .......... 418/55.5; 418/55.3; 418/57

(58) Field of Classification Search ........ 418/55.1–55.6, 418/57, 104, 270
See application file for complete search history.

(56) References Cited

U.S. PATENT DOCUMENTS

| | | | |
|---|---|---|---|
| 4,431,388 A | 2/1984 | Eber et al. | |
| 4,846,633 A | 7/1989 | Suzuki et al. | |
| 4,877,382 A | 10/1989 | Caillat et al. | |
| 4,911,620 A | 3/1990 | Richardson, Jr. et al. | |
| 5,080,566 A * | 1/1992 | Sakata et al. | 418/55.3 |
| 5,102,316 A | 4/1992 | Caillat et al. | |
| 5,188,520 A | 2/1993 | Nakamura et al. | |
| 5,215,451 A | 6/1993 | Hara et al. | |
| 5,241,495 A | 8/1993 | Sasaki | |
| 5,280,230 A | 1/1994 | Mahoney | |
| 5,281,114 A | 1/1994 | Bush | |
| 5,336,058 A | 8/1994 | Yokoyama | |
| 5,407,335 A | 4/1995 | Caillat et al. | |
| 5,411,384 A | 5/1995 | Bass et al. | |

(Continued)

FOREIGN PATENT DOCUMENTS

| | | |
|---|---|---|
| CN | 1103932 | 6/1995 |
| CN | 1196776 | 10/1998 |

(Continued)

OTHER PUBLICATIONS

International Search Report regarding International Application No. PCT/US2008/010604 dated Feb. 24, 2009.

(Continued)

*Primary Examiner* — Theresa Trieu
(74) *Attorney, Agent, or Firm* — Harness, Dickey & Pierce, P.L.C.

(57) ABSTRACT

A compressor may include a shell and a housing fixed within the shell. A compression mechanism may be supported by the housing and may include an orbiting scroll member and a non-orbiting scroll member that are meshingly engaged to form a series of compression pockets. A retaining assembly may include an axial retention member and a rotational retention member, each of which is engaged with the non-orbiting scroll member to limit axial translation and rotation of the non-orbiting scroll member relative to the housing.

19 Claims, 7 Drawing Sheets

U.S. PATENT DOCUMENTS

| | | | |
|---|---|---|---|
| 5,447,418 A | | 9/1995 | Takeda et al. |
| 5,451,148 A | | 9/1995 | Matsuzaki et al. |
| 5,462,418 A | | 10/1995 | Shimizu et al. |
| 5,470,213 A | | 11/1995 | Iguchi et al. |
| 5,478,223 A | | 12/1995 | Yamamoto et al. |
| 5,487,653 A | | 1/1996 | Lee |
| 5,511,959 A | * | 4/1996 | Tojo et al. ............... 418/55.5 |
| 5,527,166 A | * | 6/1996 | Chang et al. ............ 418/55.5 |
| 5,580,230 A | | 12/1996 | Keifer et al. |
| 5,683,236 A | | 11/1997 | Harrison et al. |
| 5,863,191 A | | 1/1999 | Motegi et al. |
| 5,897,306 A | * | 4/1999 | Beck ...................... 418/55.3 |
| 5,921,761 A | | 7/1999 | Eckels |
| 6,017,203 A | * | 1/2000 | Sugawa et al. .......... 418/55.5 |
| 6,056,524 A | | 5/2000 | Williams et al. |
| 6,095,764 A | | 8/2000 | Shibamoto et al. |
| 6,113,373 A | | 9/2000 | Fukuhara et al. |
| 6,132,191 A | | 10/2000 | Hugenroth et al. |
| 6,142,754 A | | 11/2000 | Hsiao et al. |
| 6,193,485 B1 | | 2/2001 | Ueda et al. |
| 6,241,495 B1 | | 6/2001 | Chang |
| 6,307,356 B1 | | 10/2001 | Dwelley |
| 6,419,457 B1 | | 7/2002 | Seibel et al. |
| 6,494,688 B1 | | 12/2002 | Barito et al. |
| 6,537,044 B2 | | 3/2003 | Chang et al. |
| 6,679,683 B2 | | 1/2004 | Seibel et al. |
| 6,821,092 B1 | | 11/2004 | Gehret et al. |
| 6,884,046 B2 | | 4/2005 | Matsukawa et al. |
| 6,896,497 B2 | * | 5/2005 | Kuo ....................... 418/55.5 |
| 6,953,330 B1 | | 10/2005 | Muto |
| 6,984,115 B1 | | 1/2006 | Tarng et al. |
| 7,074,013 B2 | | 7/2006 | Seibel et al. |
| 7,140,851 B2 | | 11/2006 | Tarng |
| 7,300,265 B2 | | 11/2007 | Stover |
| 7,553,140 B2 | | 6/2009 | Stover |
| 7,914,268 B2 | | 3/2011 | Su |
| 2005/0201883 A1 | | 9/2005 | Clendenin et al. |
| 2006/0198748 A1 | | 9/2006 | Grassbaugh et al. |
| 2006/0204379 A1 | | 9/2006 | Seibel et al. |
| 2006/0204380 A1 | | 9/2006 | Seibel et al. |
| 2006/0245968 A1 | | 11/2006 | Gopinathan et al. |
| 2007/0059192 A1 | | 3/2007 | Stover |
| 2007/0134117 A1 | | 6/2007 | Liang et al. |

FOREIGN PATENT DOCUMENTS

| | | |
|---|---|---|
| CN | 1197892 | 11/1998 |
| CN | 1349053 | 5/2002 |
| JP | 62225793 A | 10/1987 |
| JP | 63173884 A | 7/1988 |
| JP | 63239391 A | 10/1988 |
| JP | 1130082 A | 5/1989 |
| JP | 5180175 A | 7/1993 |
| JP | 6140473 A | 5/1994 |
| JP | 6307356 A | 11/1994 |
| JP | 07027063 | 1/1995 |
| JP | 07063173 | 3/1995 |
| JP | 08261176 | 10/1996 |
| JP | 09317667 | 12/1997 |
| JP | 11022660 | 1/1999 |
| JP | 11182462 | 7/1999 |
| JP | 2001082354 | 3/2001 |
| JP | 2003065255 | 3/2003 |
| KR | 1019950006252 | 3/1995 |
| KR | 100186867 | 5/1999 |
| KR | 1019990060803 | 7/1999 |
| KR | 1020010035761 | 7/2001 |
| KR | 1020020030018 | 4/2002 |
| KR | 1020050008475 | 1/2005 |
| KR | 1020070030111 | 3/2007 |

OTHER PUBLICATIONS

Written Opinion of the International Searching Authority regarding International Application No. PCT/US2008/010604 dated Feb. 24, 2009.

International Preliminary Report on Patentability regarding International Application No. PCT/US2008/010604 dated Mar. 16, 2010.

International Search Report regarding International Application No. PCT/US2008/010623 dated Feb. 26, 2009.

Written Opinion of the International Searching Authority regarding International Application No. PCT/US2008/010623 dated Feb. 26, 2009.

International Search Report regarding International Application No. PCT/US2008/010597 dated Feb. 19, 2009.

Written Opinion of the International Searching Authority regarding International Application No. PCT/US2008/010597 dated Feb. 19, 2009.

Chinese Office Action regarding Application No. 200880106347, dated Dec. 13, 2011. Translation provided by Unitalen Attorneys At Law.

International Search Report regarding International Application No. PCT/US2008/010622 dated Feb. 24, 2009.

International Preliminary Report on Patentability regarding International Application No. PCT/US2008/010622 dated Mar. 16, 2010.

Declaration of Non-Establishment of International Search Report regarding PCT/US2008/010624, dated Apr. 24, 2009; ISA/KR.

International Preliminary Report on Patentability (Chapter II) regarding PCT/US2008/010624 dated Jan. 14, 2010, IPEA/KR, 10 pages.

Written Opinion of the International Searching Authority regarding International Application No. PCT/US2008/010622 dated Feb. 24, 2009, 4 pages.

Written Opinion of the International Searching Authority regarding PCT/US2008/010624, dated Apr. 24, 2009; ISA/KR, 3 pages.

Second Office Action from the State Intellectual Property Office for People's Republic of China regarding Chinese Patent Application No. 200880106347.7, dated Aug. 30, 2012. Translation provided by Unitalen Attorneys at Law.

First Chinese Office Action regarding Application No. 200880115902.2, dated Dec. 1, 2011. Translation provided by Unitalen Attorneys at Law.

Second Chinese Office Action regarding Application No. 200880115902.2, dated May 15, 2012. Translation provided by Unitalen Attorneys at Law.

First Chinese Office Action regarding Application No. 200880106340.5, dated Feb. 24, 2012. Partial translation provided by Unitalen Attorneys at Law.

U.S. Office Action regarding U.S. Appl. No. 12/207,051, mailed Feb. 9, 2011.

U.S. Notice of Allowance regarding U.S. Appl. No. 12/207,051, mailed Jul. 15, 2011.

U.S. Notice of Allowance regarding U.S. Appl. No. 12/207,036, mailed Dec. 9, 2010.

First Chinese Office Action regarding Application No. 200880106311.9, dated Dec. 9, 2011. Partial translation provided by Unitalen Attorneys at Law.

U.S. Office Action regarding U.S. Appl. No. 12/207,016, mailed Jan. 31, 2011.

U.S. Notice of Allowance regarding U.S. Appl. No. 12/207,016, mailed Jul. 11, 2011.

U.S. Notice of Allowance regarding U.S. Appl. No. 12/207,089, mailed Feb. 3, 2011.

First Chinese Office Action regarding Application No. 200880106327, dated Nov. 10, 2011. Translation provided by Unitalen Attorneys at Law.

* cited by examiner

COMPRESSOR WITH RETAINING MECHANISM

CROSS-REFERENCE TO RELATED APPLICATIONS

This application claims the benefit of U.S. Provisional Application Nos. 60/993,451, 60/993,452, 60/993,464 and 60/993,465, each filed on Sep. 11, 2007 and U.S. Provisional Application No. 61/038,162, filed Mar. 20, 2008. The entire disclosures of each of the above applications are incorporated herein by reference.

FIELD

The present disclosure relates to compressors, and more specifically to compressor retaining mechanisms.

BACKGROUND

Scroll compressors may typically include orbiting and non-orbiting scroll members meshingly engaged with one another. The non-orbiting scroll member may generally be rotationally fixed to a bearing housing using a fastener. The use of the fastener may require machining a bore in a flange of the non-orbiting scroll member to receive the bolt. An additional sleeve guide may be used in combination with the bolt to provide for limited axial travel of the non-orbiting scroll member relative to the main bearing housing. The machining of the bore and the addition of a sleeve guide may provide additional cost and assembly times for a compressor assembly.

SUMMARY

A compressor may include a shell and a housing fixed within the shell. A compression mechanism may be supported by the housing and may include an orbiting scroll member and a non-orbiting scroll member that are meshingly engaged to form a series of compression pockets. A retaining assembly may include an axial retention member and a rotational retention member, each of which is engaged with the non-orbiting scroll member to limit axial translation and rotation of the non-orbiting scroll member relative to the housing.

The axial retention member may include a retaining ring fixed to the housing and disposed around a perimeter of the non-orbiting scroll member. The non-orbiting scroll member may include a protrusion extending radially outwardly relative to the perimeter and located axially between the housing and the retaining ring to limit axial translation of the non-orbiting scroll member relative to the housing. The compressor of may additionally include a fastener extending through the retaining ring and the housing to fix the retaining ring relative thereto.

The rotational retention member may include a pin engaged with the non-orbiting scroll member and the housing. The non-orbiting scroll member may be slidably engaged with the pin. The non-orbiting scroll member may be axially displaceable relative to the shell and the pin may generally extend in the direction of axial displacement of the non-orbiting scroll member.

The compressor may additionally include an Oldham coupling engaged with the orbiting and non-orbiting scroll members to prevent relative rotation therebetween. The non-orbiting scroll member may include a keyway extending into an inlet pocket of the compression mechanism and receiving a portion of the Oldham coupling therein. The Oldham coupling may form a rotational retention member and may include a key extending into a slot in the housing to prevent relative rotation between the non-orbiting scroll member and the housing.

The housing may include a main bearing housing. The main bearing housing may include a radially extending portion having arms extending axially therefrom. The axial retention member may be engaged with the arms and the rotational retention member may be engaged with the radially extending portion.

The axial retention member may limit radial translation of the non-orbiting scroll member relative to the housing.

The rotational retention member may include a pin engaged with the non-orbiting scroll member and the axial retention member.

The shell may include a partition overlying the non-orbiting scroll member and engaged with the housing to form the axial retention member. The partition may include an axially extending protrusion engaged with and forming a first axial guide for the non-orbiting scroll member. The housing may include an axially extending arm engaged with and a forming a second axial guide for the non-orbiting scroll member.

A compressor may alternatively include a shell, a housing fixed within the shell, a compression mechanism supported by said housing and including an orbiting scroll member and a non-orbiting scroll member meshingly engaged to form a series of compression pockets, and a retaining assembly. The retaining assembly may include an axial retention member and a rotational retention member. The axial retention member may include a retaining ring fixed to the housing and disposed around a perimeter of the non-orbiting scroll member. The non-orbiting scroll member may include a protrusion extending radially outwardly relative to the perimeter and located axially between the housing and the retaining ring to limit axial translation of the non-orbiting scroll member relative to the housing. The rotational retention member may be engaged with the non-orbiting scroll member to limit axial translation and rotation of the non-orbiting scroll member relative to the housing.

The rotational retention member may include a pin engaged with the non-orbiting scroll member and the housing.

A compressor may alternatively include a shell, a housing fixed within the shell, a compression mechanism supported by the housing and including an orbiting scroll member and a non-orbiting scroll member meshingly engaged to form a series of compression pockets, and a retaining assembly. The retaining assembly may include an axial retention member and a rotational retention member. The axial retention member may be engaged with the non-orbiting scroll member to limit axial translation of the non-orbiting scroll member relative to the housing. The rotational retention member may include a pin engaged with the non-orbiting scroll member and the housing. The non-orbiting scroll member may be slidably engaged with the pin.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present teachings are suitable for incorporation in many different types of scroll compressors, including hermetic machines, open drive machines and non-hermetic machines. For exemplary purposes, a compressor 10 is shown as a hermetic scroll refrigerant-compressor of the low-side type, i.e., where the motor and compressor are cooled by suction gas in the hermetic shell, as illustrated in the vertical section shown in FIG. 1.

Figure 1:
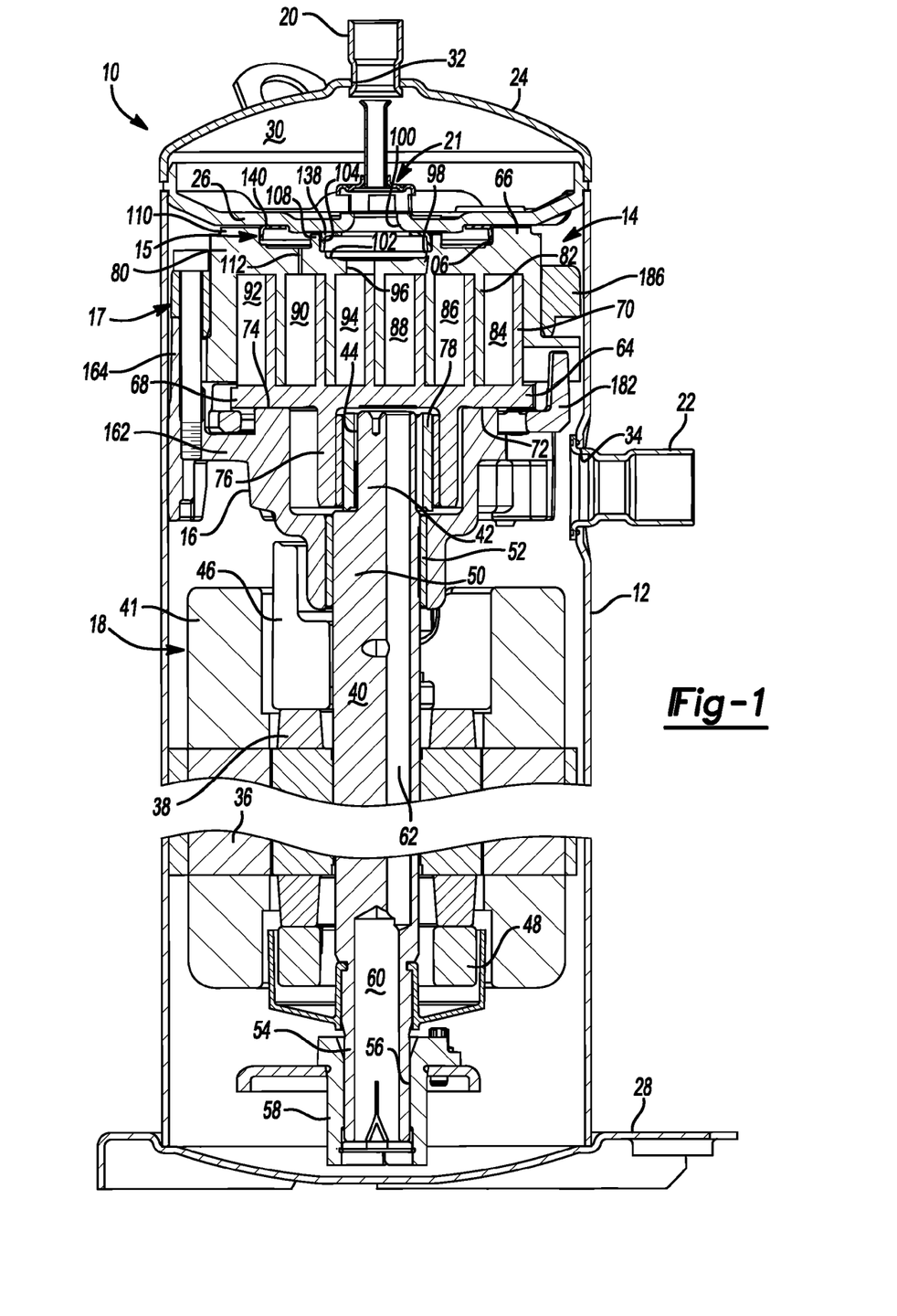
FIG. 1 is a sectional view of a compressor according to the present disclosure.

With reference to FIG. 1, compressor 10 may include a cylindrical hermetic shell 12, a compression mechanism 14, a seal assembly 15, a main bearing housing 16, a retaining assembly 17, a motor assembly 18, a refrigerant discharge fitting 20, a discharge valve assembly 21, and a suction gas inlet fitting 22. Hermetic shell 12 may house compression mechanism 14, main bearing housing 16, and motor assembly 18. Shell 12 may include an end cap 24 at the upper end thereof, a transversely extending partition 26, and a base 28 at a lower end thereof. End cap 24 and transversely extending partition 26 may generally define a discharge muffler 30. Refrigerant discharge fitting 20 may be attached to end cap 24 at opening 32. Suction gas inlet fitting 22 may be attached to shell 12 at opening 34. Compression mechanism 14 may be driven by motor assembly 18 and supported by main bearing housing 16. Main bearing housing 16 may be affixed to shell 12 at a plurality of points in any desirable manner, such as staking.

Motor assembly 18 may generally include a motor stator 36, a rotor 38, and a drive shaft 40. Windings 41 may pass through stator 36. Motor stator 36 may be press fit into shell 12. Drive shaft 40 may be rotatably driven by rotor 38. Rotor 38 may be press fit on drive shaft 40.

Drive shaft 40 may include an eccentric crank pin 42 having a flat 44 thereon and upper and lower counter-weights 46, 48. Drive shaft 40 may include a first journal portion 50 rotatably journaled in a first bearing 52 in main bearing housing 16 and a second journal portion 54 rotatably journaled in a second bearing 56 in lower bearing housing 58. Drive shaft 40 may include an oil-pumping concentric bore 60 at a lower end. Concentric bore 60 may communicate with a radially outwardly inclined and relatively smaller diameter bore 62 extending to the upper end of drive shaft 40. The lower interior portion of shell 12 may be filled with lubricating oil. Concentric bore 60 may provide pump action in conjunction with bore 62 to distribute lubricating fluid to various portions of compressor 10.

Compression mechanism 14 may generally include an orbiting scroll 64 and a non-orbiting scroll 66. With additional reference to FIG. 4, orbiting scroll 64 may include an end plate 68 having a spiral vane or wrap 70 on the upper surface thereof and an annular flat thrust surface 72 on the lower surface. End plate 68 may include a first flange 79 and a second flange (not shown) extending radially outwardly therefrom. The second flange may be generally similar to first flange 79. Therefore, it is understood that the description of first flange 79 applies equally to the second flange. First flange 79 may include a recess 83 therein to prevent rotation of orbiting scroll 64, as discussed below. Thrust surface 72 may interface with an annular flat thrust bearing surface 74 on an upper surface of main bearing housing 16. A cylindrical hub 76 may project downwardly from thrust surface 72 and may have a drive bushing 78 rotatively disposed therein. Drive bushing 78 may include an inner bore in which crank pin 42 is drivingly disposed. Crank pin flat 44 may drivingly engage a flat surface in a portion of the inner bore of drive bushing 78 to provide a radially compliant driving arrangement.

Figure 2:
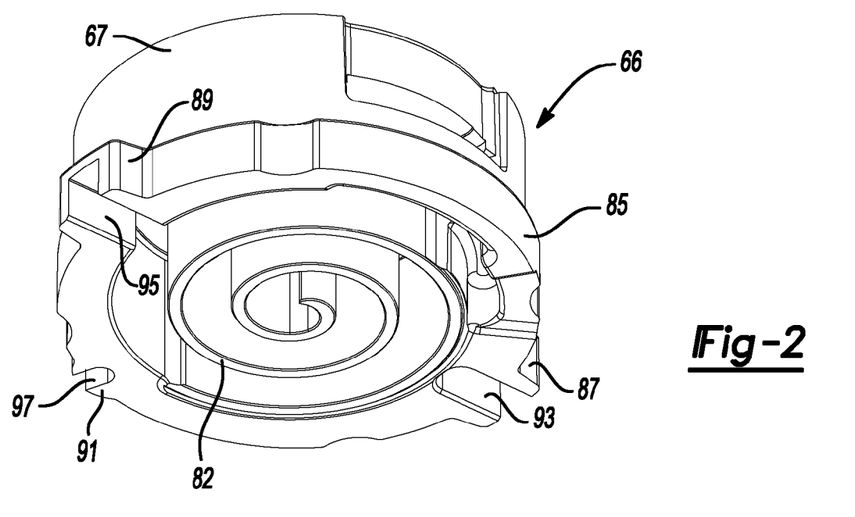
FIG. 2 is a perspective view of a non-orbiting scroll member of the compressor of FIG. 1.

With additional reference to FIG. 2, non-orbiting scroll 66 may include an end plate 80 having a spiral wrap 82 on a lower surface thereof. Spiral wrap 82 may form a meshing engagement with wrap 70 of orbiting scroll 64, thereby creating an inlet pocket 84, intermediate pockets 86, 88, 90, 92, and an outlet pocket 94. Non-orbiting scroll 66 may be axially displaceable relative to main bearing housing 16, shell 12, and orbiting scroll 64. Non-orbiting scroll 66 may include a housing 67 generally surrounding spiral wrap 82.

Housing 67 may include a radially outwardly extending flange 85 defining a radially outwardly extending protrusion to limit axial displacement of non-orbiting scroll 66 relative to main bearing housing 16, as discussed below. Flange 85 may be located at an end of housing 67 that is distal from end plate 80 and may include a series of discrete flanges 87, 89, 91 extending radially outwardly therefrom. Flanges 87, 89 may extend generally opposite one another with flange 91 disposed circumferentially therebetween. Flanges 87, 89, 91 may include recesses 93, 95, 97 therein for preventing rotation and orbital movement of non-orbiting scroll 66 relative to main bearing housing 16. Recess 95 may extend radially through radially inner and outer portions of flange 85 and into inlet pocket 84.

Non-orbiting scroll 66 may include a discharge passageway 96 in communication with outlet pocket 94 and upwardly open recess 98 which may be in fluid communication with discharge muffler 30 via an opening 100 in partition 26. Recess 98 may include first and second portions 102, 104. First portion 102 may have a cross-sectional area that is less than the cross-sectional area of second portion 104. Discharge passageway 96 may be offset relative to a center of recess 98.

Non-orbiting scroll 66 may include an annular recess 106 in the upper surface thereof defined by parallel coaxial inner and outer side walls 108, 110. Annular recess 106 may provide for axial biasing of non-orbiting scroll 66 relative to orbiting scroll 64, as discussed below. More specifically, a passage 112 may extend through end plate 80 of non-orbiting scroll 66, placing recess 106 in fluid communication with intermediate pocket 90. While passage 112 is shown extending into intermediate pocket 90, it is understood that passage 112 may alternatively be placed in communication with any of the other intermediate pockets 86, 88, 92.

Seal assembly 15 may include first and second seals 138, 140. First and second seals 138, 140 may each include an L-shaped cross-section and may sealingly engage partition 26, as described in "Compressor Sealing Arrangement", filed Sep. 9, 2008, U.S. application Ser. No. 12/207,051, the disclosure of which is incorporated herein by reference. Discharge valve assembly 21 may generally prevent a reverse flow of fluid during compressor shut-down, as described in "Compressor Having a Shutdown Valve", filed Sep. 9, 2008, U.S. application Ser. No. 12/207,089, the disclosure of which is incorporated herein by reference.

Figure 3:
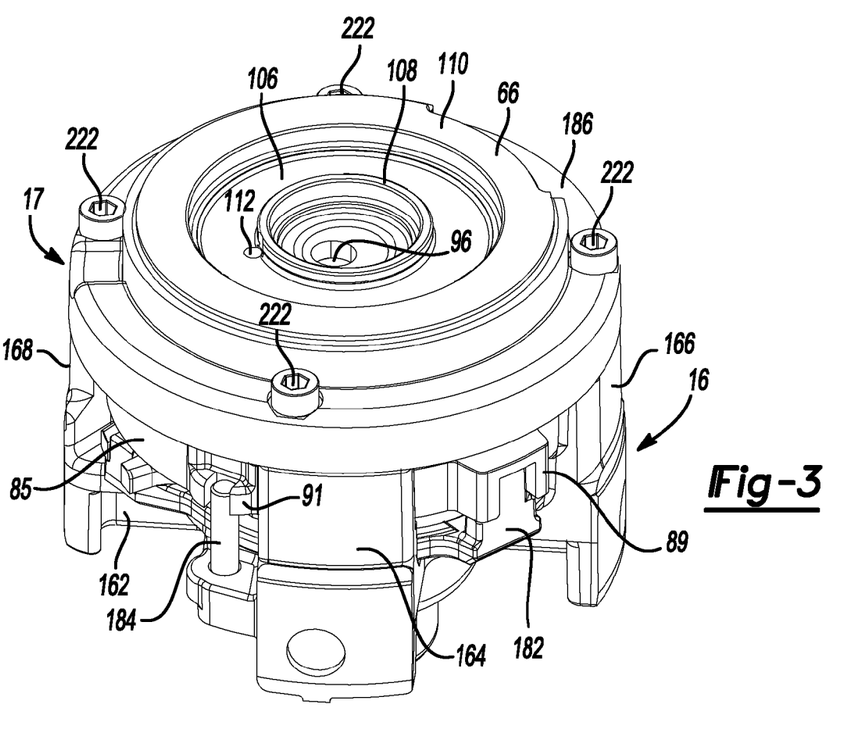
FIG. 3 is a perspective view of a portion of the compressor of FIG. 1.
Figure 4:
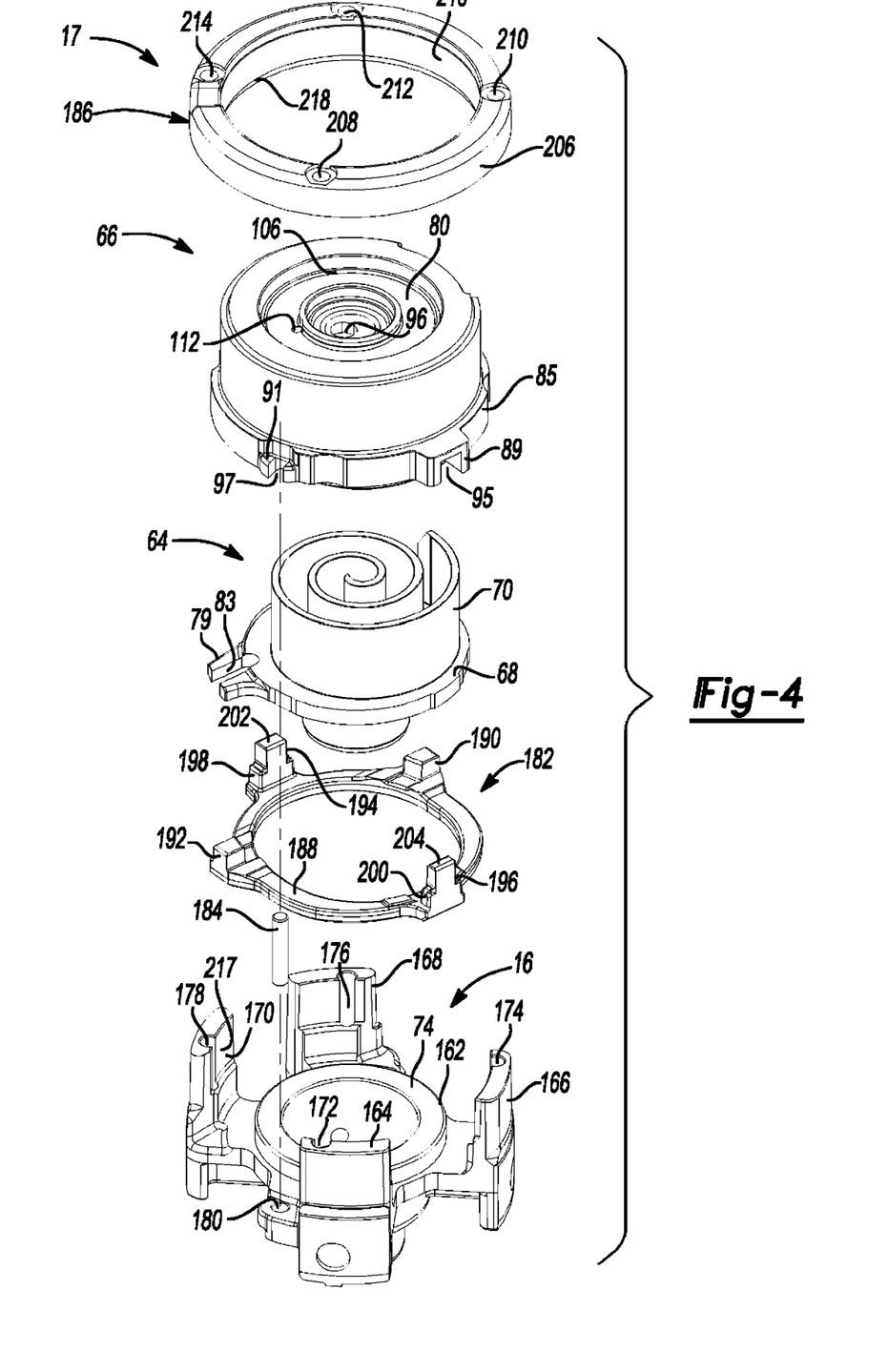
FIG. 4 is a perspective exploded view of the portion of the compressor shown in FIG. 3.

With additional reference to FIGS. 3 and 4, orbiting scroll 64 and non-orbiting scroll 66 may generally be supported by main bearing housing 16. Main bearing housing 16 may include a radially extending body portion 162 defining thrust bearing surface 74 and having arms 164, 166, 168, 170 extending axially upwardly therefrom. More specifically, arms 164, 166, 168, 170 may extend axially upwardly to a location at least at a midpoint of one of wraps 70, 82. Each of arms 164, 166, 168, 170 may include a threaded aperture 172, 174, 176, 178 extending axially into an upper surface thereof. An additional aperture 180 may extend axially into radially extending body portion 162 near arm 164. Apertures 172, 174, 176, 178, 180 may provide mounting locations for components of retaining assembly 17, as discussed below.

Retaining assembly 17 may include an Oldham coupling 182, an orientation pin 184, and a retaining ring 186. Oldham coupling 182 may be a four-up Oldham coupling including a ring 188 and first, second, third, and fourth keys 190, 192, 194, 196. Third and fourth keys 194, 196 may each include first portions 198, 200 and second portions 202, 204. Oldham coupling 182 may be disposed on and abut body portion 162. Oldham coupling 182 may be located within arms 164, 166, 168, 170. Orbiting scroll 64 may abut thrust bearing surface 74 and may be disposed adjacent Oldham coupling 182.

First and second keys 190, 192 may extend into recesses 83 of orbiting scroll 64, slidably coupling orbiting scroll 64 relative thereto and generally preventing rotation of orbiting scroll 64 relative thereto. Second portions 202, 204 of third and fourth keys 194, 196 may be slidably engaged with recesses 93, 95 in non-orbiting scroll 66, generally preventing rotation of non-orbiting scroll 66 relative to Oldham coupling 182. Since recess 95 may extend into inlet pocket 84, a travel of Oldham coupling 182 within recess 95 may be maintained while reducing the radially outward extent of flange 89 relative to a configuration of flange 89 where recess 95 does not extend into inlet pocket 84.

Orientation pin 184 may extend into recess 97 in non-orbiting scroll 66 and aperture 180 in main bearing housing 16. At least a portion of the orientation in 184 may be located radially inward relative to an outer circumference of a key 190, 192, 194, 196 of the Oldham coupling 182. Orientation pin 184 may further limit orbital and rotational movement of non-orbiting scroll 66. More specifically, orientation pin 184 may prevent rotation of non-orbiting scroll 66 relative to main bearing housing 16. Orientation pin 184 may be a generally cylindrical member and may be located within aperture 180 in main bearing housing 16 and slidably disposed within recess 97 in non-orbiting scroll 66. While shown as an independent member, orientation pin 184 may be integrally formed on main bearing housing 16. Since third and fourth keys 194, 196 fix non-orbiting scroll 66 against rotation relative to Oldham coupling 182, orientation pin 184 also prevents rotation of Oldham coupling 182 relative to main bearing housing 16.

Axial displacement of non-orbiting scroll 66 may be limited by retaining ring 186. Retaining ring 186 may include a generally annular body 206 having a series of apertures 208, 210, 212, 214 corresponding to apertures 172, 174, 176, 178 in arms 164, 166, 168, 170 of main bearing housing 16. Body 206 may include first and second portions 216, 218. First portion 216 may have apertures 208, 210, 212, 214 passing therethrough. Second portion 218 may extend axially outwardly from first portion 216 toward body portion 162 of main bearing housing 16. Second portion 218 may have an outer diameter that is less than the outer diameter of first portion 216. Second portion 218 may have an outer diameter that is slightly less than an inner diameter defined by an upper portion 217 of arms 164, 166, 168, 170 of main bearing housing 16.

The inner diameter of retaining ring 186 may be slightly greater than the outer diameter of end plate 80 of non-orbiting scroll 66 and less than the outer diameter of flange 85 of non-orbiting scroll 66. Non-orbiting scroll 66 may be supported within main bearing housing 16 such that flange 85 is disposed axially between retaining ring 186 and body portion 162 of main bearing housing 16. Second portion 218 of retaining ring 186 may extend into arms 164, 166, 168, 170 of main bearing housing 16 and first portion 216 may abut upper surfaces of arms 164, 166, 168, 170. Second portion 218 may include a tapered surface to facilitate placing retaining ring 186 over non-orbiting scroll 66 during assembly. Fasteners 222 may extend into apertures 208, 210, 212, 214 of retaining ring 186 and may threadingly engage apertures 172, 174, 176, 178 in arms 164, 166, 168, 170 of main bearing housing 16, fixing retaining ring 186 relative thereto. Axial displacement of non-orbiting scroll 66 may therefore be limited to an axial clearance between flange 85 and retaining ring 186.

Figure 5:
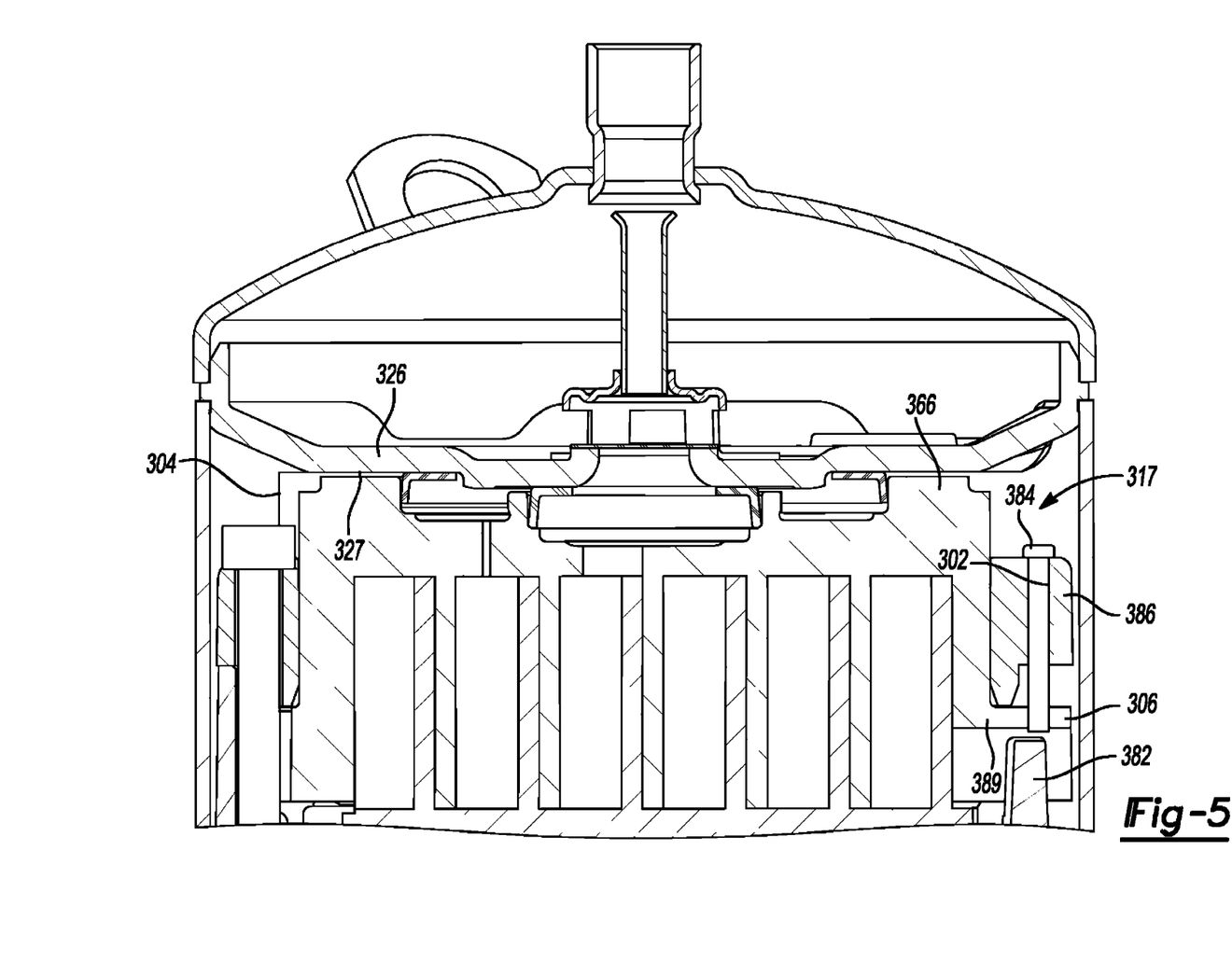
FIG. 5 is a fragmentary sectional view of an alternate compressor according to the present disclosure.
Figure 6:
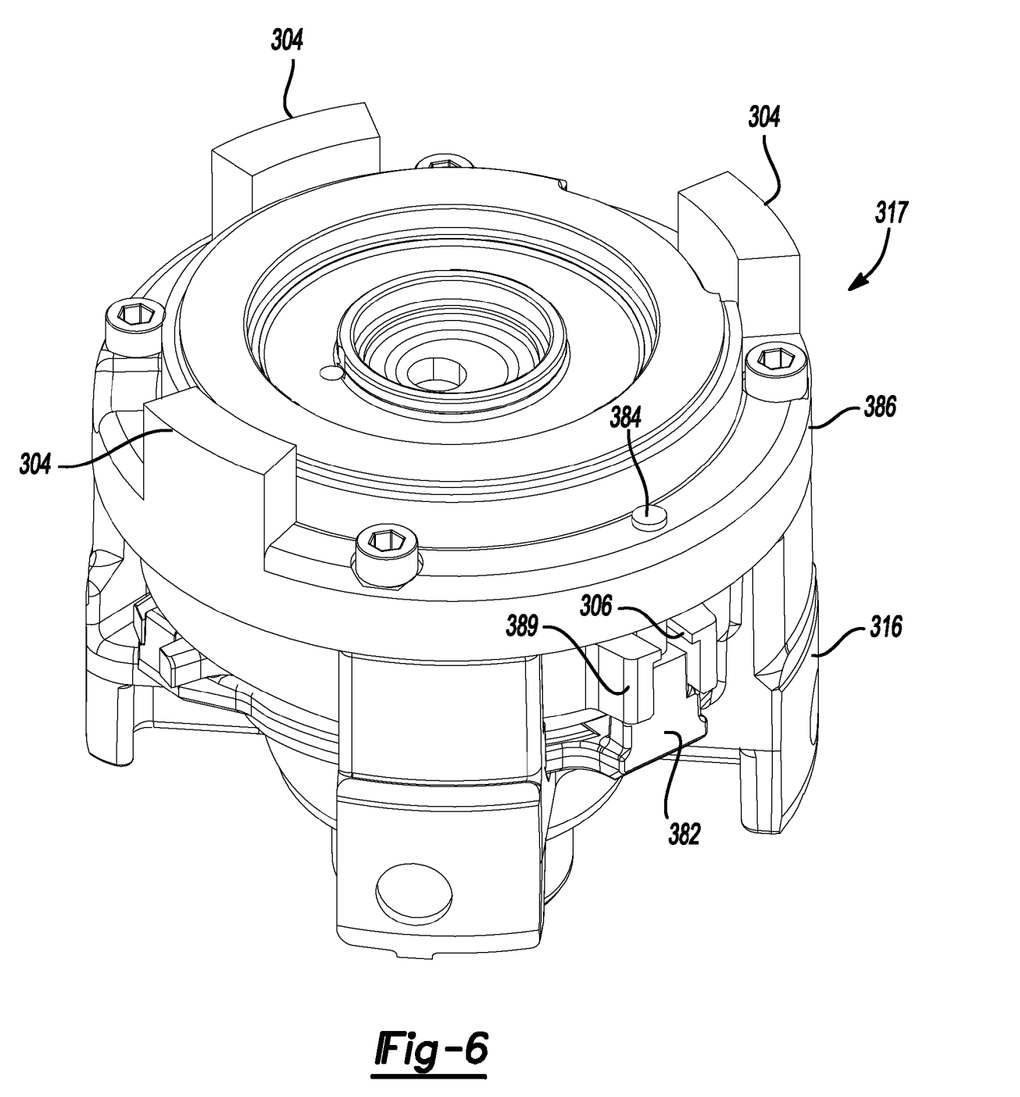
FIG. 6 is a perspective view of a portion of the compressor of FIG. 5.

With reference to FIGS. 5 and 6, an alternate retaining assembly 317 is shown. Retaining assembly 317 may include an Oldham coupling 382, an orientation pin 384, and a retaining ring 386. Oldham coupling 382 may be generally similar to Oldham coupling 182 and orientation pin 384 may be generally similar to orientation pin 184. However, orientation pin 384 may be engaged with non-orbiting scroll 366 and retaining ring 386, as discussed below. Similar to the arrangement discussed above, at least a portion of the orientation pin 384 may be located radially inward relative to an outer circumference of a key of the Oldham coupling 382.

Retaining ring 386 may be generally similar to retaining ring 186 with the exception of aperture 302 and protrusions 304. Aperture 302 may extend axially through retaining ring 386 an opening 306 may extend into flange 389 of non-orbiting scroll 366. Orientation pin 384 may extend through aperture 302 and opening 304. Since retaining ring 386 is fixed to main bearing housing 316 (similar to retaining ring 186), relative rotation between non-orbiting scroll 366 and main bearing housing may be prevented by orientation pin 384.

Protrusions 304 may be spaced around an axially outer surface of retaining ring 386 and may extend axially outwardly relative to an axial end of non-orbiting scroll 366. With reference to FIG. 5, protrusions 304 may abut a lower surface 327 of partition 326. More specifically, during assembly, once retaining ring 386 is fixed to main bearing housing 316, partition 326 may be inserted into shell 312 until a lower surface 327 thereof abuts protrusions 304, locating partition 326 relative to main bearing housing 316. Partition 326 may then be fixed to shell 312.

Figure 7:
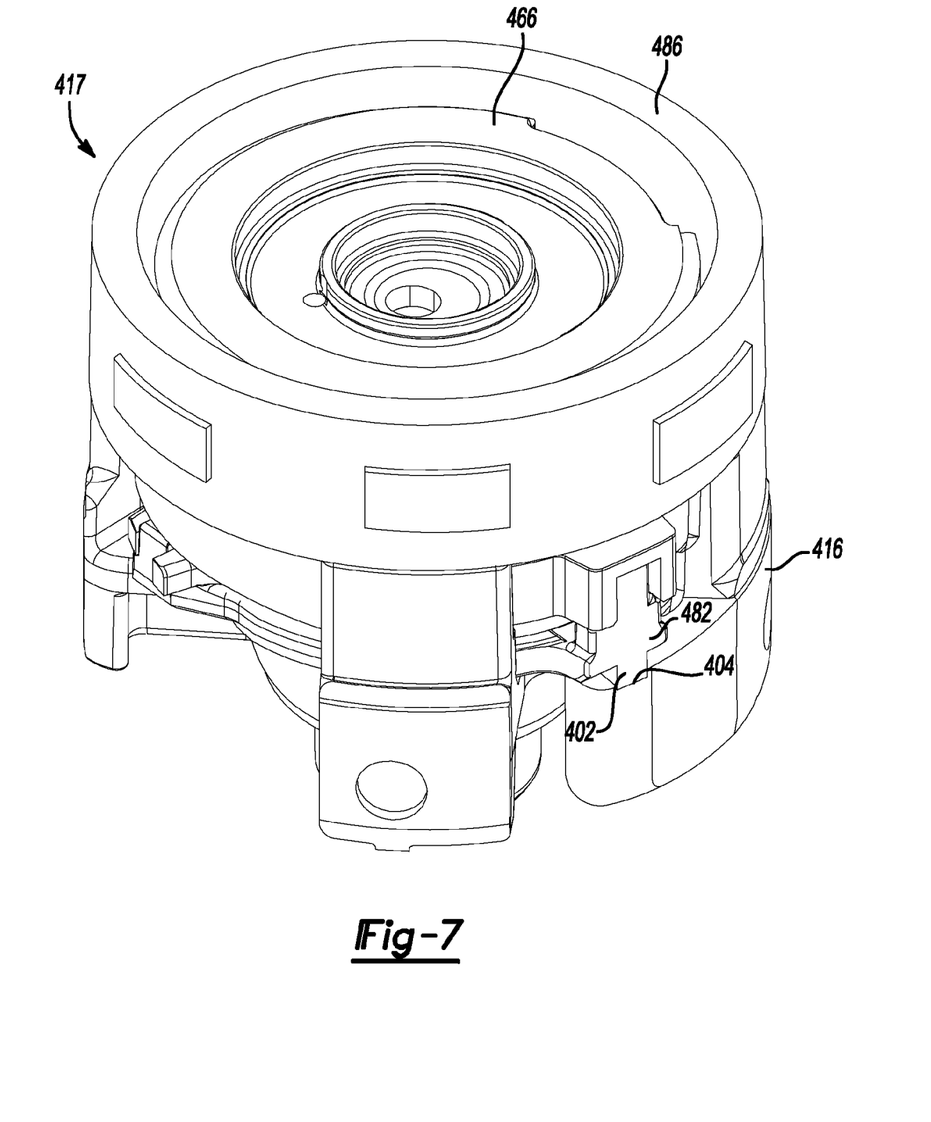
FIG. 7 is a perspective view of a portion of an alternate compressor according to the present disclosure.

With reference to FIG. 7, an alternate retaining assembly 417 is shown. Retaining assembly 417 may include an Oldham coupling 482 and a retaining ring 486. Oldham coupling 482 may be generally similar to Oldham coupling 182, except Oldham coupling 482 may include a fifth key 402. Fifth key 402 may extend into a slot 404 in main bearing housing 416 to prevent relative rotation between Oldham coupling 482 and main bearing housing 416, and therefore between non-orbiting scroll 466 and main bearing housing 416.

Retaining ring 486 may be generally similar to retaining rings 186, 386, except retaining ring 486 may having an axially outward extent generally equal to protrusions 304 around an entire circumferential extent thereof. As such, an engagement between retaining ring 486 and a partition (not shown) may be generally similar to the engagement between retaining ring 386 and partition 326. Additionally, rather than being bolted to main bearing housing 416, retaining ring 486 may be press fit into the compressor shell (not shown).

While retaining assemblies 17, 317, 417 have been individually described with various features, it is understood that the features of retaining assemblies 17, 317, 417 may be interchanged and used with one another in a variety of combinations.

Figure 8:
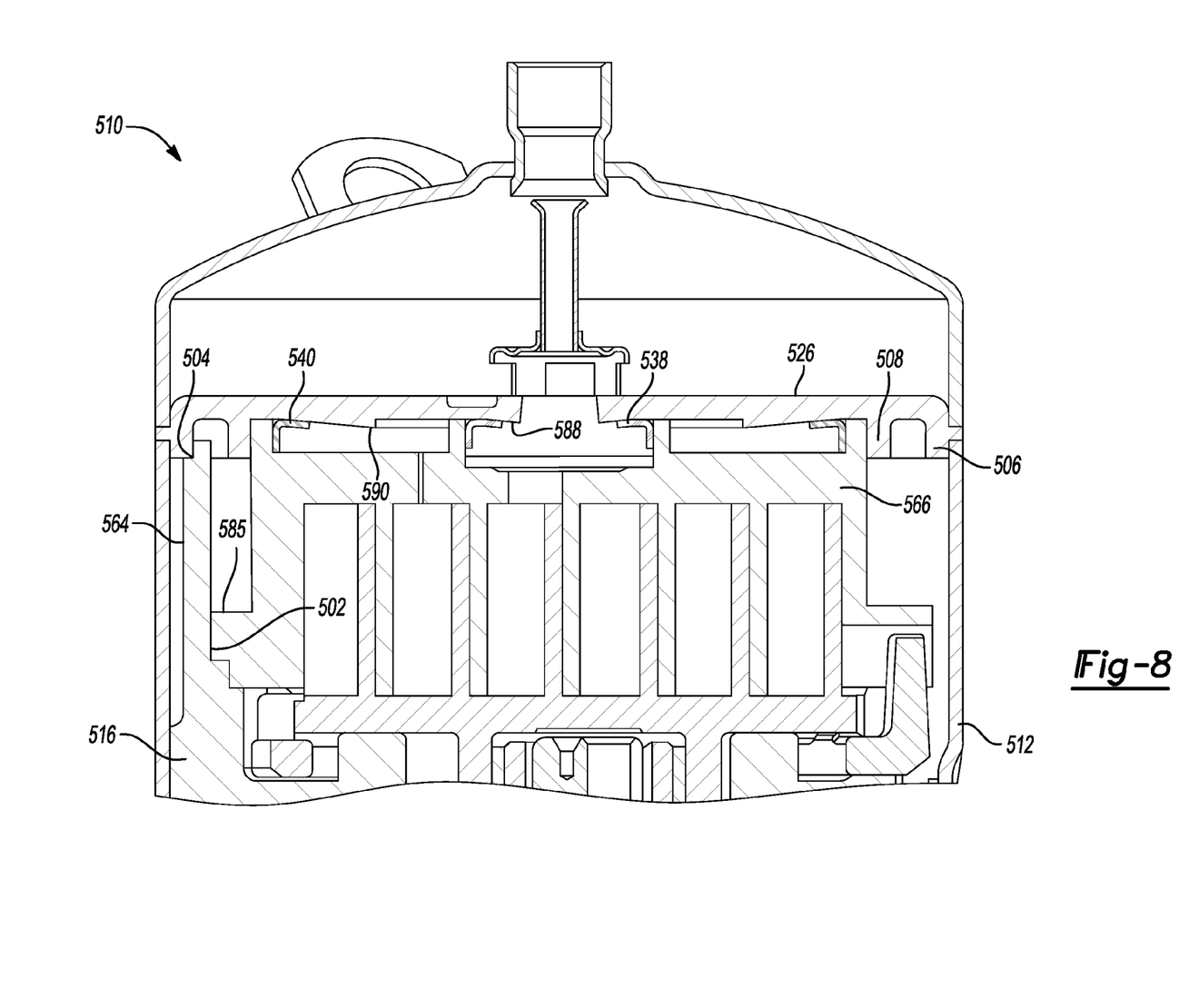
FIG. 8 is a fragmentary sectional view of an alternate compressor according to the present disclosure.

With reference to FIG. 8, an alternate compressor 510 is shown. Compressor 510 may be generally similar to compressor 10, with the exception of main bearing housing 516 and partition 526. Arms 564 of main bearing housing 516 may have a greater axial extent than arms 164 of main bearing housing 16 and may contact partition 526, as discussed below.

Main bearing housing 516 may form a pilot ring for flange 585 of non-orbiting scroll 566. More specifically, a radially inner surface 502 of arm 564 may generally surround and form a first guide for axial displacement of flange 585. An axially outer end of arm 564 may additionally form locating region for partition 526. Arm 564 may include a stepped region 504 forming a locating region for partition 526. Therefore, partition 526 may be located relative to main bearing housing 516 independent of the position of main bearing housing 516 within shell 512.

Partition 526 may include first and second annular protrusions 506, 508 extending axially toward main bearing housing 516. First protrusion 506 may extend axially within shell 512 and may abut stepped region 504 to locate partition 526 relative to main bearing housing 516. Second protrusion 508 may be located radially inwardly relative to first protrusion 506 and may form a second guide for axial displacement of an upper portion of non-orbiting scroll 566. More specifically, a radially inner surface of second protrusion 508 may generally surround and may be generally parallel to an outer surface of non-orbiting scroll 566.

Partition 526 may additionally include first and second sealing portions 588, 590. First and second sealing portions 588, 590 may include axially inwardly extending ramped surfaces engaging first and second annular seals 538, 540. First and second sealing portions 588, 590 may generally inhibit radially inward displacement of first and second annular seals 538, 540.

What is claimed is:

1. A compressor comprising:
a shell;
a housing fixed within said shell;
a compression mechanism supported by said housing and including an orbiting scroll member and a non-orbiting scroll member meshingly engaged to form a series of compression pockets;
a retaining assembly including an axial retention member and a rotational retention member, each of said axial and rotational retention members engaged with said non-orbiting scroll member to limit axial translation and rotation of said non-orbiting scroll member relative to said housing; and
an Oldham coupling engaged with said orbiting and non-orbiting scroll members to prevent relative rotation therebetween, said Oldham coupling forming said rotational retention member and including a key extending into a slot in said housing to prevent relative rotation between said non-orbiting scroll member and said housing.

2. The compressor of claim 1, wherein said axial retention member includes a retaining ring fixed to said housing and disposed around a perimeter of said non-orbiting scroll member, said non-orbiting scroll member including a protrusion extending radially outwardly relative to said perimeter and located axially between said housing and said retaining ring to limit axial translation of said non-orbiting scroll member relative to said housing.

3. The compressor of claim 2, further comprising a fastener extending through said retaining ring and said housing to fix said retaining ring relative thereto.

4. The compressor of claim 1, wherein said non-orbiting scroll member includes a keyway extending into an inlet pocket of said compression mechanism and receiving a portion of said Oldham coupling therein.

5. The compressor of claim 1, wherein said housing includes a main bearing housing.

6. The compressor of claim 5, wherein said main bearing housing includes a radially extending portion having arms extending axially therefrom, said axial retention member engaged with said arms.

7. The compressor of claim 1, wherein said axial retention member limits radial translation of said non-orbiting scroll member relative to said housing.

8. A compressor comprising:
a shell;
a housing fixed within said shell;
a compression mechanism supported by said housing and including an orbiting scroll member and a non-orbiting scroll member meshingly engaged to form a series of compression pockets, said non-orbiting scroll member including a keyway extending into an inlet pocket of said compression mechanism and being axially displaceable relative to said shell;
an Oldham coupling engaged with said orbiting and non-orbiting scroll members and extending into said keyway to prevent relative rotation between said orbiting and non-orbiting scroll members; and
a retaining assembly including a rotational retention member including a pin engaged with said non-orbiting scroll member to limit rotation of said non-orbiting scroll member relative to said housing with at least a portion of said pin being located radially inward relative to an outer circumference of a key of said Oldham coupling.

9. The compressor of claim 8, wherein said non-orbiting scroll member is axially displaceable relative to said shell and said retaining assembly includes an axial retention member engaged with said non-orbiting scroll member to limit axial translation of said non-orbiting scroll member relative to said housing.

10. The compressor of claim 9, wherein said axial retention member includes a retaining ring fixed to said housing and disposed around a perimeter of said non-orbiting scroll member, said non-orbiting scroll member including a protrusion extending radially outwardly relative to said perimeter and located axially between said housing and said retaining ring to limit axial translation of said non-orbiting scroll member relative to said housing.

11. The compressor of claim 10, further comprising a fastener extending through said retaining ring and said housing to fix said retaining ring relative thereto.

12. The compressor of claim 9, wherein said pin is engaged with said non-orbiting scroll member and said housing.

13. The compressor of claim 12, wherein said non-orbiting scroll member is slidably engaged with said pin.

14. The compressor of claim 13, wherein said pin generally extends in the direction of axial displacement of said non-orbiting scroll member.

15. The compressor of claim 9, wherein said housing includes a main bearing housing having a radially extending portion with arms extending axially therefrom, said axial retention member engaged with said arms and said rotational retention member engaged with said radially extending portion.

16. The compressor of claim 9, wherein said axial retention member limits radial translation of said non-orbiting scroll member relative to said housing.

17. The compressor of claim 9, wherein said pin is engaged with said non-orbiting scroll member and said axial retention member.

18. A compressor comprising:
a shell including a partition;
a housing fixed within said shell and including an axially extending arm;
a compression mechanism supported by said housing and including an orbiting scroll member and a non-orbiting scroll member meshingly engaged to form a series of compression pockets, said axially extending arm engaged with said non-orbiting scroll member and forming an axial guide for said non-orbiting scroll member; and
a retaining assembly including an axial retention member and a rotational retention member, each of said axial and rotational retention members engaged with said non-orbiting scroll member to limit axial translation and rotation of said non-orbiting scroll member relative to said housing, said partition overlying said non-orbiting scroll member and engaged with said housing to form said axial retention member.

19. The compressor of claim 18, wherein said partition includes an axially extending protrusion engaged with said non-orbiting scroll member and forming an additional axial guide for said non-orbiting scroll member.

* * * * *

UNITED STATES PATENT AND TRADEMARK OFFICE
CERTIFICATE OF CORRECTION

PATENT NO. : 8,356,987 B2  
APPLICATION NO. : 12/207072  
DATED : January 22, 2013  
INVENTOR(S) : Huaming Guo et al.

It is certified that error appears in the above-identified patent and that said Letters Patent is hereby corrected as shown below:

In the Specification:

| | |
|---|---|
| Column 1, Lines 51-52 | After "compressor" delete "of". |
| Column 2, Line 22 | After "and" delete "a". |
| Column 5, Line 50 | "orientation in 184" should be --orientation pin 184--. |
| Column 6, Line 45 | "an opening" should be --and opening--. |
| Column 7, Line 5 | "having" should be --have--. |

Signed and Sealed this  
Seventeenth Day of December, 2013

Margaret A. Focarino  
*Commissioner for Patents of the United States Patent and Trademark Office*

UNITED STATES PATENT AND TRADEMARK OFFICE
CERTIFICATE OF CORRECTION

| | | |
|---|---|---|
| PATENT NO. | : 8,356,987 B2 | Page 1 of 1 |
| APPLICATION NO. | : 12/207072 | |
| DATED | : January 22, 2013 | |
| INVENTOR(S) | : Guo et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 623 days.

Signed and Sealed this
Eleventh Day of November, 2014

Michelle K. Lee
*Deputy Director of the United States Patent and Trademark Office*